United States Patent [19]

Arthurs et al.

[11] Patent Number: 4,896,934
[45] Date of Patent: Jan. 30, 1990

[54] BROADBAND OPTICAL MULTICAST SWITCH

[75] Inventors: Edward Arthurs, Summit; Matthew S. Goodman, Belle Meade; Chong K. Kim, Livingston; Tony T. Lee, Bridgewater, all of N.J.

[73] Assignee: Bell Communications Research, Inc., Livingston, N.J.

[21] Appl. No.: 306,528

[22] Filed: Feb. 3, 1989

[51] Int. Cl.⁴ .............................................. G02B 6/28
[52] U.S. Cl. ................................ 350/96.16; 350/96.15
[58] Field of Search ................. 350/96.15, 96.16, 96.18

[56] References Cited

U.S. PATENT DOCUMENTS

| | | | |
|---|---|---|---|
| 3,937,557 | 2/1976 | Milton | 350/96.18 X |
| 4,474,425 | 10/1984 | Kaede | 350/96.16 |
| 4,484,794 | 11/1984 | Witte | 350/96.16 |
| 4,566,753 | 1/1986 | Mannschke | 350/96.18 X |
| 4,653,845 | 3/1987 | Tremblay et al. | 350/96.16 |
| 4,708,424 | 11/1987 | Marhic | 350/96.16 |
| 4,761,780 | 8/1988 | Bingham et al. | 37/60 |
| 4,781,427 | 11/1988 | Husbands et al. | 350/96.16 |
| 4,787,692 | 11/1988 | Spanke | 350/96.16 |
| 4,801,190 | 1/1989 | Imoto | 350/96.16 |
| 4,834,483 | 5/1989 | Arthurs et al. | 350/96.16 |

OTHER PUBLICATIONS

"Dynamic TDM-A Packet Approach to Broadband Networking", L. T. Wu et al., IEEE Int. Conference on Communications, pp. 1585–1592, Seattle, Washington, 1987.

"A Packet Network for BISDN Applications", L. T. Wu et al., Proc. of 1988, Zurich Seminar on Digital Communications, pp. 191–197, Zurich, 1988.

"Implication of Very Wide Fiber Bandwidth for Network Architecture", Peter O'Reilly, Fiber and Integrated Optics, 7:159–171, 1988.

"A Broadband Packet Switch for Multi-Rate Services", Joseph Hui, IEEE International Conference on Communications, pp. 22.4.1–22.4.7, 1987.

"HYPASS: An Optoelectronic Hybrid Packet-Switching System", E. Arthurs et al., J. on Selected Areas Commun., 6:1500–1510, Dec. 1988.

"High-Bit-Rate Measurements in the Lambdanet Multiwavelength Optical Star Network", M. P. Vecchi et al., Optical Fiber Communications Conference, WO2, p. 95, New Orleans, LA, Jan. 1988.

"Demonstration of High Capacity in the Lambdanet Architecture: A Multiwavelength Optical Network", H. Kobrinski et al., Electorn. Lett., vol. 23, No. 16, pp. 824–826, Jul. 1987.

"The Architecture of a Multicast Broadband Packet Switch", T. T. Lee et al., Proc. of INFOCOM '88, pp. 1–8, 1988.

"Non-Blocking Copy Networks for Multicast Packet Switch", T. T. Lee, Proc. Int. Zurich Seminar on Digital Communications, pp. 221–229, 1988.

"A Photonic Knockout Switch for High-Speed Packet Networks", K. Y. Eng, IEEE/IEICE Global Telecomm. Conf., pp. 47.2.1–47.2.5, Tokyo, Dec. 1987.

"Multihop Lightwave Networks: A New Approach to Achieve Terabit Capabilities", A. S. Acampora et al., Proc. ICC '88, 1:1478–1483, Jul. 1988.

(List continued on next page.)

Primary Examiner—John D. Lee
Assistant Examiner—Phan T. Heartney
Attorney, Agent, or Firm—James W. Falk

[57] ABSTRACT

An optical switch for use in a fiber optic telecommunications network is disclosed. An important feature of the inventive switch is its multicast capability. The inventive switch utilizes two internal networks, an optical network for transmission and an electronic network for control. Illustratively, the transmission network is an optical star network which links the input ports and output ports of the inventive switch. The electronic control network is in the form of a track or ring which surrounds the optical star and sequentially connects the input and output ports.

16 Claims, 8 Drawing Sheets

OTHER PUBLICATIONS

"Reservation-Based Contention Resolution Mechanism for Batcher-Banyan Packet Switches", B. Bingham and H. Bussey, Elect. Lett., vol. 24, No. 13, pp. 772-773, Jun. 1988.

"Optical Frequency-Selective Amplication in a Distributed Feedback Type Semiconductor Laser Amplifier", H. Kawaguchi et al., Appl. Phys. Lett., 50:66-67, Jan. 1987.

"Wavelength Selection with Nanosecond Switching Times Using Distributed-Feedback Optical Amplifiers", M. P. Vecchi et al., 14th European Conf. on Optical Communications, pp. 247-250, Brighton, England, Sep. 1988.

"Eight Channel Wavelength-Division Switching Experiment Using Wide-Tuning-Range DFB LD Filters", M. Nishio et al., Proc. of the 14th European Conf. on Comm., pp. PDP 49-52, Brighton, England, Sep. 1988.

"Tunable Wavelength Filters Using $\lambda/4$-Shifted Waveguide Grating Resonators", T. Numai et al., Appl. Phys. Lett., 53:83-85, Jul. 1988.

"Electro-Optically Tunable Narrowband Ti:LiNbO$_3$ Wavelength Filter", F. Heismann et al., Elec. Lett., 23:572-574, May 1987.

"Polarization Independent Electro-Optically Tunable Narrow-Band Wavelength Filter", W. Warzansky et al., Appl. Phys. Lett., 53:13-15, Jul. 1988.

"Ten-Channel Coherent HDTV/TV Distribution System", H. M. Foisel 13th, European Conf. on Optical Commun., pp. 287-290, Helsinki, Finland, 1987.

"A Coherent Photonic Wavelength-Division Switching System for Broadband Networks", M. Fujiwara et al., Proc. of the 14th European Conf. on Comm., pp. 139-142, Brighton, England, Sep. 1988.

"Tunable Optical Heterodyne Receiver for Coherent FDM Broadcasting Systems", S. Yamazaki et al., Proc. of the 14th European Conf. on Comm., pp. 86-89, Brighton, England, Sep. 1988.

FIG. 3
PACKET FORMAT

| DATA FIELD | SOURCE ADDRESS FIELD | DESTINATION BIT-MAP FIELD | PRIORITY BITS FIELD |
|---|---|---|---|
| DATA | SA | $d_N...d_1$ | $P_K...P_1$ |

FIG. 4
TOKEN FORMAT

| SOURCE ADDRESS FIELD | OUTPUT AVAILABILITY FIELD |
|---|---|
| $A_N,...,A_1$ | $a_N...a_1$ |

FIG. 5
INPUT PORT COMPARATOR OPERATION

| $d_i$ | $a_i$ | $e_i$ |
|---|---|---|
| 0 | 0 | 1 |
| 0 | 1 | 1 |
| 1 | 0 | 1 |
| 1 | 1 | 0 |

FIG. 6

| SA | $d_8...d_1$ | $A_8,\quad...\quad,A_1$ | $a_8...a_1$ |
|---|---|---|---|
| 1 | 01000100 | 0, 1, 0, 0, 0, 1, 0, 0 | 01000100 |
| 2 | 00001000 | 0, 1, 0, 0, 2, 1, 0, 0 | 01001100 |
| 3 | 10000001 | 3, 1, 0, 0, 2, 1, 0, 3 | 11001101 |
| 4 | 01010000 | 3, 1, 0, 0, 2, 1, 0, 3 | 11001101 |
| 5 | 00000011 | 3, 1, 0, 0, 2, 1, 0, 3 | 11001101 |
| 6 | 01000000 | 3, 1, 0, 0, 2, 1, 0, 3 | 11001101 |
| 7 | 00000000 | 3, 1, 0, 0, 2, 1, 0, 3 | 11001101 |
| 8 | 00100000 | 3, 1, 8, 0, 2, 1, 0, 3 | 11101101 |

| SA | $d_8 \ldots d_1$ | $A_8, \quad \ldots \quad , A_1$ | $a_8 \ldots a_1$ |
|---|---|---|---|
| 1 | 01000100 | 0, 1, 0, 0, 0, 1, 0, 0 | 01000100 |
| 2 | 00001000 | 0, 1, 0, 0, 2, 1, 0, 0 | 01001100 |
| 3 | 10000001 | 3, 1, 0, 0, 2, 1, 0, 3 | 11001101 |
| 4 | 01010000 | 3, 1, 0, 4, 2, 1, 0, 3 | 11011101 |
| 5 | 00000011 | 3, 1, 0, 4, 2, 1, 5, 3 | 11011111 |
| 6 | 01000000 | 3, 1, 0, 4, 2, 1, 5, .3 | 11011111 |
| 7 | 00000000 | 3, 1, 0, 4, 2, 1, 5, 3 | 11011111 |
| 8 | 00100000 | 3, 1, 8, 4, 2, 1, 5, 3 | 11111111 |

FIG. 11

EXAMPLE OF WRITE PHASE
CONTENTION WITH TWO PRIORITY
CLASSES AND CALL SPLITTING

| SA | $d_8 \ldots d_1$ | $P_2P_1$ | | $A_8,$ | | ... | | ,$A_1$ | | $a_8 \ldots a_1$ |
|---|---|---|---|---|---|---|---|---|---|---|

SUB-PHASE NUMBER 1:

| SA | $d_8 \ldots d_1$ | $P_2P_1$ | $A_8, \ldots, A_1$ | $a_8 \ldots a_1$ |
|---|---|---|---|---|
| 1 | 01000100 | 10 | | |
| 2 | 00001000 | 01 | 0, 0, 0, 0, 2, 0, 0, 0 | 00001000 |
| 3 | 10000001 | 01 | 3, 0, 0, 0, 2, 0, 0, 3 | 10001001 |
| 4 | 01010000 | 01 | 3, 4, 0, 4, 2, 0, 0, 3 | 11011001 |
| 5 | 00000011 | 10 | | |
| 6 | 01000000 | 10 | | |
| 7 | 00000000 | 00 | | |
| 8 | 00100000 | 01 | 3, 4, 8, 4, 2, 0, 0, 3 | 11111001 |

SUB-PHASE NUMBER 2:

| SA | $d_8 \ldots d_1$ | $P_2P_1$ | $A_8, \ldots, A_1$ | $a_8 \ldots a_1$ |
|---|---|---|---|---|
| 1 | 01000100 | 10 | 3, 4, 8, 4, 2, 1, 0, 3 | 11111101 |
| 2 | 00001000 | 01 | | |
| 3 | 10000001 | 01 | | |
| 4 | 01010000 | 01 | | |
| 5 | 00000011 | 10 | 3, 4, 8, 4, 2, 1, 5, 3 | 11111111 |
| 6 | 01000000 | 10 | 3, 4, 8, 4, 2, 1, 5, 3 | 11111111 |
| 7 | 00000000 | 00 | | |
| 8 | 00100000 | 01 | | |

BROADBAND OPTICAL MULTICAST SWITCH

FIELD OF THE INVENTION

The present invention relates to an optical switch for use in a fiber optic telecommunications network, and more particularly, to an optical switch with multicast capability.

BACKGROUND OF THE INVENTION

The question of whether future broadband networks will be composed of circuit switches with independent networks of packet switches, or circuit switches with packet channel emulation or vise versa, has been controversial (see, e.g., L.T. Wu, S.H. Lee, and T.T. Lee, "Dynamic TDM—A Packet Approach to Broadband Networking", in IEEE Int. Conference on Communications, Seattle, Washington, 1987; L.T. Wu, E. Arthurs, and W.D. Sincoski, "A Packet Network for BISDN Applications", in B. Platner and P. Gunzburger, editors, Proc. of 1988 Zurich Seminar on Digital Commun., pages 191-197, Zurich, 1988; Peter O'Reilly, "Implication of Very Wide Fiber Bandwidth for Network Architecture", Fiber and Integrated Optics, 7:159-171, 1988). The widespread use of optical fibers in the public network has made equally controversial the question of whether the switches will be non-blocking electronic designs with fixed internal channel bandwidth linking demultiplexed optical input channels (see, e.g., Y.N. Hui and E. Arthurs, "A Broadband Packet Switch for Multirate Services", in IEEE International Conference on Communications, Seattle, Washington, 1987) or hybrid electronic/optical designs (see, e.g., E. Arthurs, M.S. Goodman, H. Kobrinski, and M.P. Vecchi, "HYPASS: An Optoelectronic Hybrid Packet-Switching System", J. on Selected Areas Commun., 6:1500-1510,1988) or even all optically controlled switches.

These questions have been exacerbated by the rapid developments in electro-optic device technology, which is producing better lasers whose modulation rates are continually increasing. Recent experiments have demonstrated the potential of individual laser modulation rates in excess of 10 Gbits/sec. Furthermore, experiments using multiwavelength technology have demostrated a data transmission rate of more than 36 Gbits/sec for point-to-point links over an individual single-mode optical fiber using eighteen separate single wavelength channels, each modulated at 2 Gbits (see, e.g., M.P. Vecchi, R.M. Bulley, M.S. Goodman, H. Kobrinski, and C.A. Brackett, "High-bit-rate Measurements in the LAMBDANET Multiwavelength Optical Star Network", in Optical Fiber Commun. Conf., WO2, page 95, New Orleans, LA, January 1988; see also, H. Kobrinski, R.M. Bulley, M.S. Goodman, M.P. Vecchi, C.A. Brackett, L. Curtis, and J.L. Gimlett, "Demostration of High Capacity in the LAMBDANET Architecture: A Multiwavelength Optical Network", Electron. Lett., 23:824,1987).

There is also the question as to whether network switching elements should incorporate only unicast traffic or whether broadcast traffic (e.g., one-to-many video switching) or multicast traffic (e.g. selective broadcast) should be integrated as well. While some electronic network switches (see, e.g., T.T. Lee, R. Boorstyn, and E. Arthurs, "The Architecture of a Multicast Broadband Packet Switch", Proc. of INFOCOM'88, page 1, 1988; T.T. Lee, "Nonblocking Copy Networks for Multicast Packet Switching," Proc. Int. Zurich Seminar on Digital Communications, pages 221-229,1988) have incorporated a multicast capability, previous multiwavelength optical switch designs (see, e.g., E. Arthurs, M.S. Goodman, H. Kobrinski, and M.P. Vecchi, "HYPASS: An Optoelectronic Hybrid Packet-Switching System," J. on Selected Areas Commun, 6:1500-1510, 1988; K.Y. Eng, "A Photonic Knockout Switch For High Speed Packet Networks", in IEEE/IEICE Global Telecomm. Conf., pages 47.2.1-47.2.5, Tokoyo, December, 1987; A.S. Acampora, M.J. Karol, and M.G. Hluchyj, "Multihop Lightwave Networks: A New Approach to Achieve Terabit Capabilities", Proc. ICC'88, 1:1478-1484,1988) have not satisfactorily incorporated multicast capability.

In view of the above, it is an object of the present invention to provide a broadband optical switch with a throughput in the many Gbits/sec range and with multicast switching capabilities. The primary intended applications for the inventive switch are in the public network and for LAN/MAN bridging, although other applications such as packet concentration/multiplexing are possible as well. It is a further object of the invention to provide an optical switch design which can support both prioritized demand access traffic and reserved traffic, as well as provide unicast and multicast switching in a unified framework.

SUMMARY OF THE INVENTION

The present invention is an optical switch whose purpose is to route and transport packets from a plurality of input ports to a plurality of output ports. The packets arrive at the input ports via incoming optical fiber trunks and are transmitted from the output ports via outgoing optical fiber trunks. The inventive switch is formed using two internal networks. One network is an optical transmission network for transmitting packets from the input ports to the output ports. Typically, this transmission network has an optical star configuration. The second network is an electronic control network for resolving packet contention for the use of output ports.

More particularly, the optical transmission network is composed of optical transmitters and receivers connected through a wavelength insensitive optical star coupler using single mode optical fibers. Illustratively, each input port, i, has associated with it an optical transmitter with a unique wavelength $\lambda$. Each output port has one or more wavelength tunable receivers capable of tuning over some portion of the spectrum of the input ports. The optical star transmission network transmits a fraction of the power from each input port to every output port. Each output port tunes its receiver to the wavelength of the input port whose packet it is supposed to receive. Tuning takes place under the control of the control network.

Illustratively, the electronic control network is in the form of a track which sequentially links all of the input ports and output ports. At the beginning of the track is a token generator which generates control tokens. The control tokens are passed sequentially around the track from port to port.

Packets are transmitted from the input ports to the output ports in transmission cycles. Each transmission cycle comprises two control phases and a transmission phase. The transmission phase of a cycle may overlap the control phase of the subsequent cycle.

Packets arriving at the switch via the incoming trunks are stored in buffers at the input ports. During the first control phase of a transmission cycle, the input ports write information into a token indicating the output ports to which their packets are to be sent, thereby reserving the appropriate output ports. In the second control phase of a transmission cycle, the output ports read the token and tune their receivers to the appropriate input port wavelengths. During a transmission phase of a transmission cycle, packets are transmitted via the optical star transmission network from the input ports to the output ports. Simultaneously, with the startup of the transmission phase, the token generator emits a token so as to start the first control phase of the next subsequent transmission cycle. Transmission occurs in parallel from many input ports to many output ports, without collisions due to multiwavelength optical transport through the star network.

The use of the above-described switch architecture, along with the above-described three-phase transmission cycle serves to integrate unicast, broadcast, and multicast switching applications. Multicast capability is achieved when the header of a packet arriving at an input port includes the addresses of a plurality of output ports to which the packet is to be sent. This information is written into the token during the first control phase of the appropriate transmission cycle. During the second control phase, each of the output ports to which the multicast packet is to be transmitted reads the token and tunes its receiver to the fixed wavelength of the input port which has the multicast packet. Because the optical star transmission network serves to transmit a fraction of the power from every input port to all output ports, each of the output ports which is tuned to the wavelength of the input port having the multicast packet will receive and detect the multicast packet.

BRIEF DESCRIPTION OF THE DRAWING

FIG. 3 illustrates the format of data packets switched by the switches of FIG. 1 and FIG. 2.

FIG. 4 illustrates the format of a token used in connection with the switches of FIG. 1 and FIG. 2.

FIG. 5 illustrates a comparison operation performed at an input ports of the switches of FIG. 1 and FIG. 2.

FIG. 6 illustrates the write phase of a contention resolution algorithm with call splitting for use with the switches of FIG. 1 and FIG. 2.

FIG. 11 illustrates the write phase of a contention resolution algorithm with two priority classes and call splitting for use in connection with the switch of FIG. 11.

DETAILED DESCRIPTION OF THE INVENTION

A. Overall Multicast Optical Switch Architecture

Figure 1:
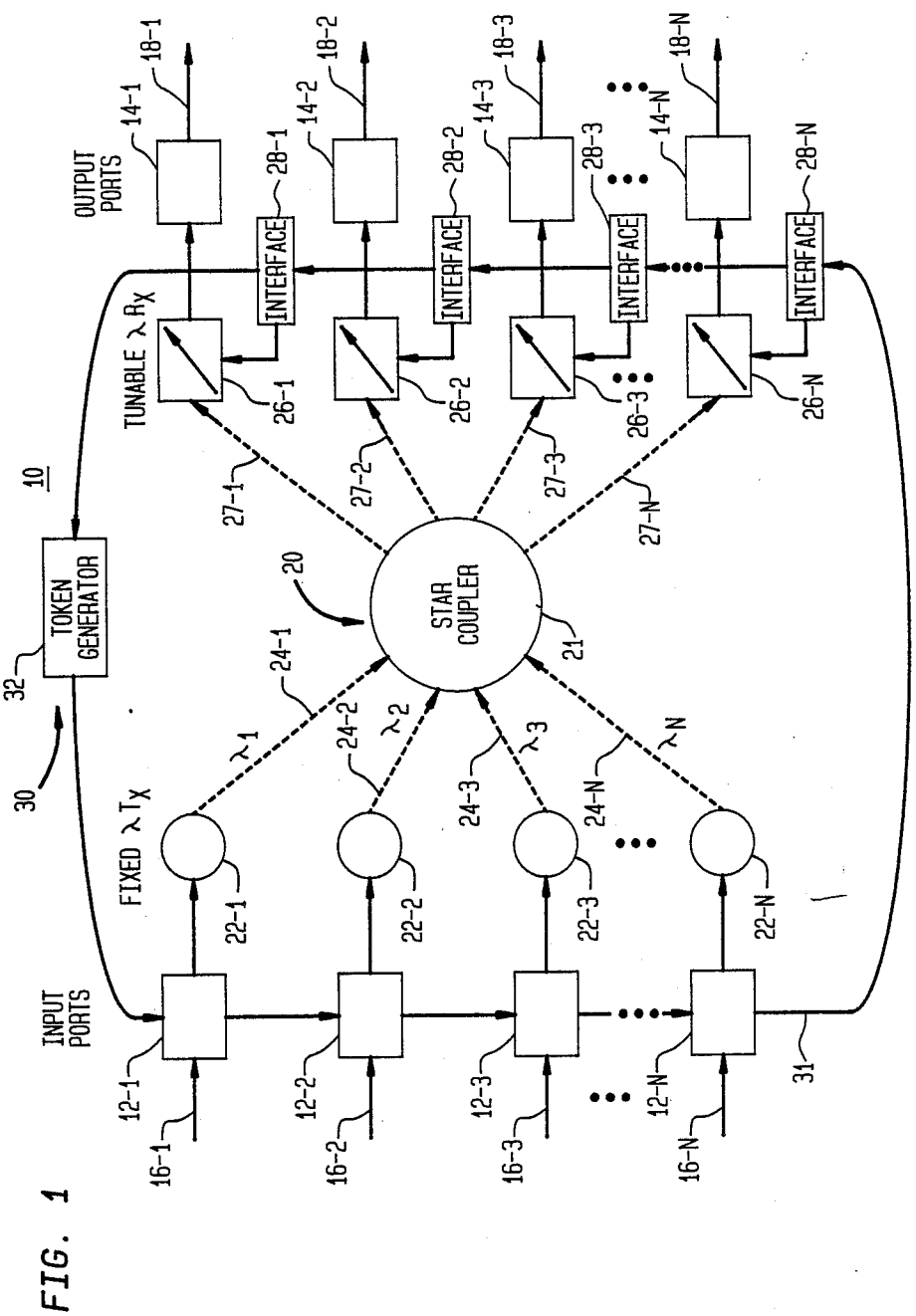
FIG. 1 schematically illustrates an optical switch with multicast capability in accordance with an illustrative embodiment of the present invention.

An optical switch 10 with multicast capability is illustrated in FIG. 1. The switch 10 comprises a plurality of input ports 12-1, 12-2, 12-3 . . . 12-N and a plurality of output ports 14-1, 14-2, 14-3 . . . 14-N. The input ports 12-1, 12-2 . . . 12-N of FIG. 1 are also designated by the addresses 1, 2, 3 . . . N respectively, i.e., the address of the input port 12-j is j. The output ports 14-1, 14-2, 14-3 . . . 14-N of FIG. 1 are also designated by the addresses 1, 2, . . . N, i.e., the output port 14-j has the address j.

Packets arrive at the input ports 12-1 . . . 12-N via corresponding incoming optical fiber trunks 16-1, 16-2 . . . 16-N. Packets leave the output ports 14-1, 14-2 . . . 14-N via corresponding outgoing optical fiber trunks 18-1, 18-2 . . . 18-N. The purpose of the switch 10 is route incoming packets arriving at the input ports via the incoming trunks to their desired output ports for transmission via the outgoing trunks.

The switch 10 comprises two internal networks. One of the networks is an optical transmission network 20. The other network is an electronic control network 30 which comprises the track 31. The track 31 surrounds the optical transmission network 20 and sequentially connects the input ports 12-1 . . . 12-N and the output ports 14-1 . . . 14-N. (For use of such an electronic track in connection with a Batcher-banyan network, see, e.g., B. Bingham and H. Bussey, "Reservation Based Contention Resolution Mechanism for Batcher-Banyan Packet Switches," Elect. Lett., 24:772-773, 1988) and Bingham et al U.S. Pat. 4,761,780.

The optical transport network 20 is composed of optical transmitters and receivers connected through a wavelength insensitive optical star coupler 21 using optical fibers More particularly, each input port, 12-1, 12-2 . . . 12-N has associated with it an optical transmitter 22-1, 22-2 . . . 22-N with unique transmitting wavelengths $\lambda_1 \ldots \lambda_1$. The transmitters 22-1, 22-2 . . . 22-N are connected to the star coupler 21 via the single mode optical fibers 24-1, 24-2 . . . 24-N. Each output port 14-1 . . . 14-N has one or more associated wavelength tunable receivers 26-1, 26-2 . . . 26-N which are connected to the star coupler 21 via the optical fibers 27-1, 27-2 . . . 27-N. The optical star coupler 21 serves to transmit a fraction of the power at each wavelength $\lambda_1\lambda_1$ to all receivers 26-1 . . . 26-N. Each receiver 26-1 . . . 26-N is tuned to detect one of the wavelengths $\lambda_1 \ldots \lambda_1$.

Tuning is carried out under the control of tokens transmitted via the control track 31. Such tokens are generated by the token generator 32 and transmitted sequentially around the track 31 to all the input ports 12 and to all the output ports 14. To this end, each output port 14-1, 14-2 . . . 14-N has an associated interface unit 28-1, 28-2 . . . 28-N which interfaces with the track 31 and reads the tokens transmitted via the track 31 to control the tuning of the tunable receivers 26-1 . . . 26-N.

The operation of the switch 10 of FIG. 1 may be described as follows. Packets arriving via the incoming trunks 16-1 . . . 16-N are buffered at the corresponding input ports 12-1 . . . 12-N. These packets are transmitted from the input ports 12-1 . . . 12-N to the output ports 14-1 . . . 14-N in transmission cycles.

Each transmission cycle comprises two control phases and a transmission phase. During the first control phase, a token generated by the token generator 32 is passed sequentially along the track 31 from one input port 12 to the next. The input ports 12 write information into the token indicating the output ports 14 to which their packets are to be sent. In the second control phase, the token is passed sequentially along the track 31 from one output port 14 to the next. The output ports 14, by means of their interfaces 28, read the token and tune their receivers 26 to the appropriate input port wavelengths. During the transmission phase the packets are transmitted from the input ports 12 to the output ports 14 in optical form via the optical transmission network 20. At the start of the transmission phase, the token generator 32 of the control network 30 produces a new token used in the control phases of the next subsequent transmission cycle, such that the control phases of one transmission cycle are executed during the transmission phase of the previous transmission cycle. Transmission occurs in parallel from many input ports to many output ports without collisions due to the multiwavelength transport capabilities of the network 20.

Figure 2:
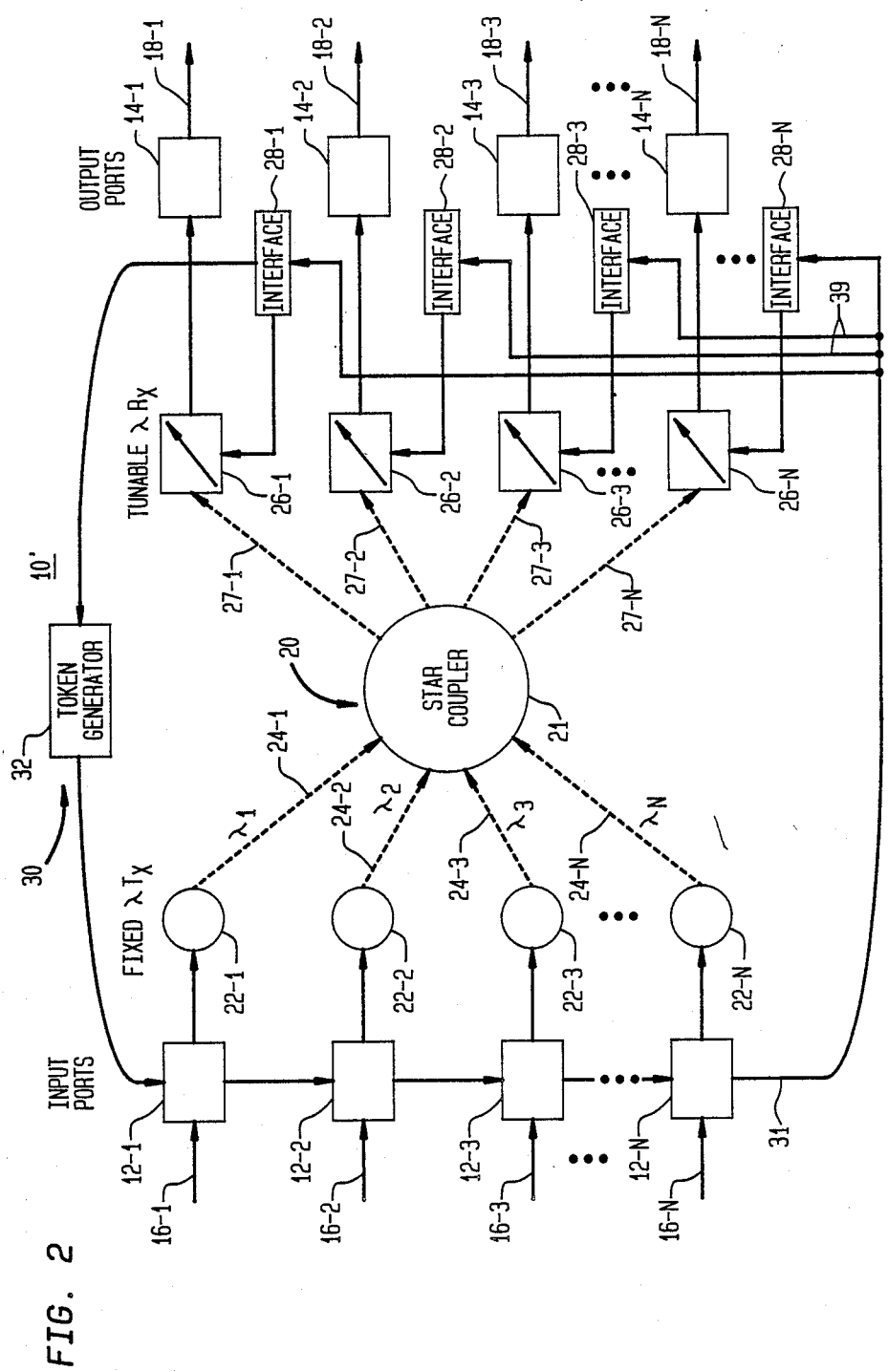
FIG. 2 schematically illustrates an alternative optical switch with multicast capability in accordance with an alternative illustrative embodiment of the invention.

In the switch 10 of FIG. 1, the token passes sequentially to the input ports 12-1 . . . 12-N which write the token during the first control phase. In the second control phase, the token passes sequentially to the output ports 14-1 . . . 14-N which read the token. FIG. 2 schematically illustrates a switch 10' which speeds up the control phase. In the switch 10', the track 31 is modified through use of the connections 39 so that the token is passed in parallel (rather than sequentially) to all of the output ports 14-1 . . . 14-N. In this case all of the interfaces 28-1 . . . 28-N read the token substantially simultaneously and the receivers 26-1 . . . 26-N are tuned substantially simultaneously.

B. Contention Resolution Algorithm

The contention resolution algorithm used in the switches 10 and 10' of FIGS. 1 and 2 is described in more detail in this section. The format of a packet arriving at one of the input ports 12 is shown in FIG. 3. Illustratively, the packet has four fields, a Data Field, a Source Address Field, a Destination Bit Map Field, and a Priority Bits Field. The Source Address Field, the Destination Bit Map Field, and the Priority Bits Field may be viewed as forming the packet header.

The Source Address (SA) Field contains the input ports address, i.e., a packet with source address (SA) j arrives at input port 12-j. The Destination Bit Map Field indicates to which output ports a packet is to be sent. There is a bit $d_1 \ldots d_N$ corresponding to each possible output port 14-1 . . . 14-N. Setting $d_i = 1$ indicates that a copy of this packet is to be transmitted to the $i^{th}$ output port 14-i. The Priority bits indicate the priority class of the packet. The $j^{th}$ priority class is indicated by $P_j + 1$ (and $P_i = 0$ for all $i \neq j$).

The format of a typical token generated by the token generator 32 of FIG. 1 is illustrated in FIG. 3. A token comprises two fields, a Source Address Field and an Output Availability Field. The Output Availability Field comprises a bit $a_i$ for each output port 14-i. A logic "1" in a particular bit position of the Output Availability Field indicates that the corresponding output port has been reserved. The token generator emits tokens with a cleared output availability field. The subfield $A_i$ in the Source Address Field of the token is the address of the input port whose packet will be transmitted to the $i^{th}$ output port (i.e. output port 14-i) if the corresponding position $a_a$ in the Output Availability Field is set equal to logic "1".

As indicated above, the control procedure comprises two phases in each transmission cycle: a write phase at the input ports and a read phase at the output ports. At each input port, the write phase comprises a comparison of the Destination Bit Map Field of a packet with the Output Availability Field of the token. The comparison results in the evaluation of $e_i + (\overline{d_i \cdot a_i})$. The values taken on by $e_i$ for different values of $d_i$ and $a_i$ are illustrated in FIG. 4. The input port writes its source address into the $i^{th}$ subfield $A_i$ of the token Source Address Field whenever $e_i + 1$ for every i which $d_i + 1$ in the packet header. In other words, the subfield $A_i$ of the token Source Address Field is written with an input port address, if the packet header at that input port phase $d_i + 1$ and if $a_i$ is available and has not been previously reserved. The input port also sets $a_i + 1$ to reserve the output port. Each input port sequentially writes its information into the token during the first control phase.

The second control phase is commenced when the token reaches the interfaces 28 of the output ports 14. The output port 14-i checks its corresponding availability bit $a_i$ in the token to see if it is needed in the transmission phase of the current transmission cycle. If $a_i = 1$, the output 14-i will be inactive during the transmission phase. If $a_i = 1$, then the output port 14-i will cause its receiver to tune to the wavelength of the input port whose address is $A_i$ as indicated in the corresponding subfield of the Source Address Field of the token. When all the output ports have finished the second control phase, the transmission phase of the current transmission cycle begins and the token generator emits a new token to start the first control phase of the immediately subsequent three-phase transmission cycle. Illustratively, the token generator is informed of the completion of the second control phase of a particular transmission cycle when the token used in the particular transmission cycle is returned to the token generator via the track 31.

FIG. 6 illustrates an example of a write phase of the contention resolution algorithm for the case of a switch having eight input ports and eight output ports. The left-hand column of FIG. 6 shows the Source Address (SA) Field and Destination Bit Map ($d_1$-$d_8$) of the packets present at each of the input ports SA=1 . . . SA=8 (i.e. input ports 12-1 . . . 12-N of FIG. 1, where N=8). The right-hand column of FIG. 6 shows the token as it sequentially passes each of the eight input ports SA=1 . . . SA=8.

Note that the packet at the input port with SA=1 is a multicast packet. In particular, its Destination Bit Map Field indicates that $d_7=1$ and $d_3=1$ so that this packet is to be routed to output ports 7 and 3 (i.e. output ports 14-7 and 14-3 of FIG. 1). Since, the token leaves the token generator 31 with a clear Output Port Availability field and the input port with SA=1 is the first input port reached by the token, $a_3$ and $a_7$ are set to logic "1" in the "Output Availability" field of the token, and the address "1" for the first input port is written into the subfields A3 and A7 of the Source Address Field of the token. The token then passes to the input port with SA=2 (corresponding to input port 12-2 in FIG. 1).

The packet at the input port with SA=2 has $d_4=1$ in its Destination Bit Map Field. Thus, this packet is a point-to-point (i.e. a unicast) packet to be routed to the output port 4 (corresponding to output 14-4 of FIG. 1).

Thus, the input port with SA=2 modifies the Output Availability field of the token so that $a_4=1$ and so that the source address SA=2 is written into the corresponding Source Address subfield $A_4$.

In this manner, the token is modified as it moves from input port to input port along the track 31. In the example of FIG. 6, it should be noted that the input port SA=7 (corresponding to input port 12-7) is idle, i.e. no destinations are indicated in its Destination Bit Map field. In addition, the input ports SA=4,5, and 6 (i.e. 12-4, 12-5, 12-6 of FIG. 1) are contending for output ports already reserved by other input ports. Thus, these input ports do not modify the token and are required to wait for the next transmission cycle to compete again for transmission.

The example of FIG. 6 shows clearly how the optical switch of the present invention successfully integrates unicast, broadcast and multicast applications. C. Call Splitting In the example of FIG. 6 described above, the packets at the input ports SA=4, 5, and 6 were required to wait a cycle before transmission.

Note that the packet at SA=4 is a multicast packet destined for the output ports corresponding to $d_5=1$ and $d_7=1$. While the output port 5 (corresponding to 14-5 of FIG. 1) is available for reservation by the input port SA=4, the output port 7 has previously been reserved by the output port SA=1. Thus, the transmission of the packet at output 4 could have been partially completed since its multicast destination was partially available. To take advantage of the partial availability of multicast destinations, a technique know as call splitting may be utilized.

Specifically, the fan out of a multicast packet is the number of output ports that are destined to receive a copy of the packet. Because the output port contention probability increases rapidly as fan out increases, a multicast packet with large fan out will probably be blocked.

Call splitting is a way to alleviate such blocking. In accordance with the call splitting technique, the multicast packet is transmitted ot one or more of its destinations in each of a plurality of successive transmission cycles. To implement call splitting in the optical switch of the present invention, the set of destination addresses of a multicast packet is divided adaptively according to available output ports as indicated by the arriving tokens in a plurality of successive transmission cycles, until the multicast packet is transmitted to all of its destinations. The use of such call splitting can alleviate the output port contention problem and improved the throughput of a multicast switch significantly.

Figures 7, 8:
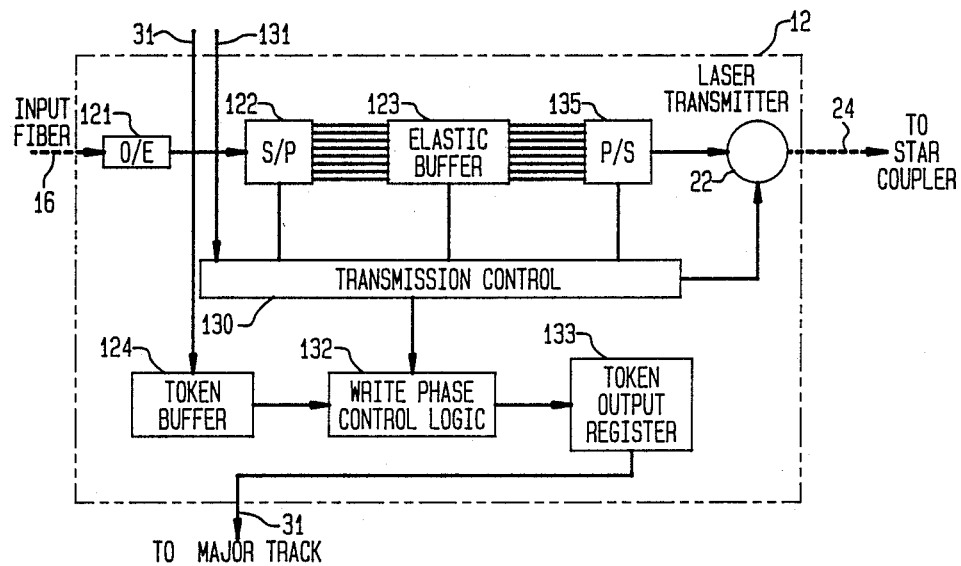
FIG. 7 illustrates the write phase of a contention resolution algorithm with call splitting for use with the switches of FIG. 1 and FIG. 2.
FIG. 8 schematically illustrates an input port for use with the switches of FIG. 1 and FIG. 2.

FIG. 7 illustrates the write phase of the contention resolution algorithm with call splitting for an optical switch of the type shown in FIG. 1 or 2 having eight input ports and eight output ports. In particular, the example of FIG. 7 is the same as the example of FIG. 6 except that call splitting is utilized. In the example of FIGS. 6 and 7, the packet at the input port with SA=4 desires the output ports 5 and 7 as indicated by $d_5$ and $d_7$ in its Destination Bit Map Field. While in the example of FIG. 6, the multicast packet at the input port with SA=4 was blocked, in the example of FIG. 7, the packet at the input port with SA=4 is split. Thus, in the example of FIG. 7, the input port with SA=4 is able to reserve the output port 5, as indicated be setting $a_5=1$ in the Output Availability Field of the token and setting $A_5=4$ in Source Address Field of the token. But, the input port with SA=4 is unable to reserve the output port 7. As indicated above, the output port 7 has been reserved by another input port higher up in chain of input ports which sequentially receive the token. Thus, transmission of the packet at SA=4 to the output port 7 is delayed until a subsequent transmission cycle.

Note that without call splitting in FIG. 6, only six of the eight output ports receive tokens in the illustrated transmission cycle. In FIG. 7, with call splitting, all eight output ports receive tokens in the illustrated transmission cycle. This in indicative of how the use of call splitting leads to more efficient use of switch resources.

D. Implementation Considerations

The design of the input ports 12 and output ports 14 of FIGS. 1 and 2 is discussed in this section.

The input port 12 (see FIGS. 1 and 2) is illustrated in greater detail in FIG. 8. A packet arrives in bit-serial optical form at the input port 12 via the incoming optical fiber trunk 16. The packet is converted to bit-serial electronic form by optical-to-electronic converter 121. The packet is then converted to parallel form by serial-to-parallel converter 122 and is stored in the buffer 123. The packet remains stored in the buffer 123 for the duration of the first and second control phases of the transmission cycle.

During the first control phase of the transmission cycle, the token is transmitted to the token buffer 124 by the track 31. Illustratively, a control and timing signal informing the control unit 130 that the token has arrived is received from the token-generator 32 (see FIGS. 1 and 2) via line 131. The token then passes from the token buffer 124 to the write phase control logic 132 where the token is written under the control of the control unit 130. The token is then buffered in the token output register 133 and synchronously passed to the next adjacent input port via the track 31.

At the completion of the second control phase of the transmission cycle, the control unit 130 receives a control signal via the line 131. The packet is then read out of the buffer 123 and converted from parallel to bit-serial form using the parallel-to-serial converter 135. The packet is then converted from electronic to optical form by modulating the output of the laser transmitter 22, which laser transmitter 22 is activated under the control of the control unit 130. The packet is then transmitted in optical form to the star coupler 21 (see FIGS. 1 and 2) via the fiber 24.

Figure 9:
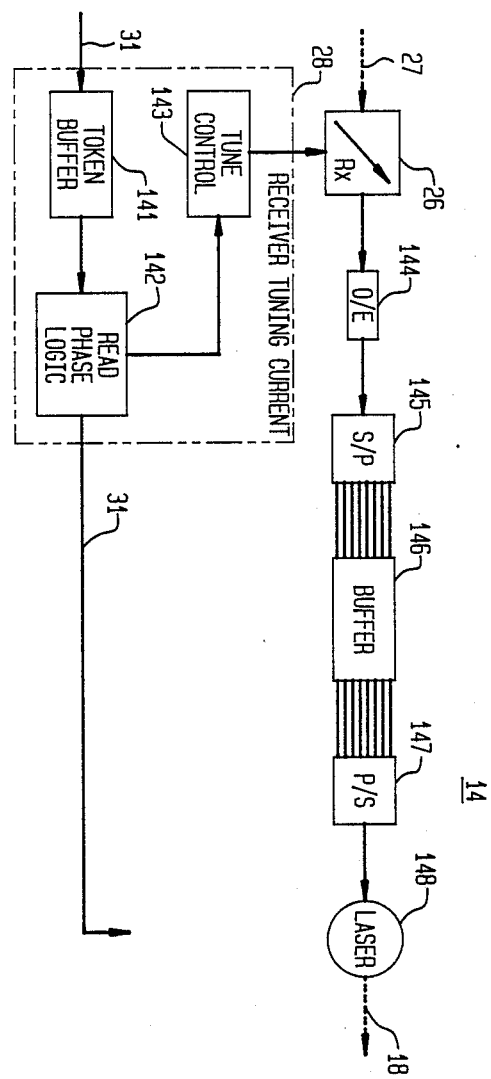
FIG. 9 schematically illustrates an output port for use with the switch of FIG. 1.

An output port 14 for use in the packet switch 10 of FIG. 1 is illustrated in FIG. 9. During the second control phase of a transmission cycle, the token arrives at the interface 28 via the track 31. The token is buffered at the token buffer 141 and read by the read phase logic 142. The read phase logic 142 transmits a signal to the tune control circuit 143 indicative of the wavelength to which the receiver 26 is to be tuned. The receiver 26 is then tuned under the control of tune control circuit 143 to the appropriate input port wavelength. The token then passes to the next output port via the track 31.

During the transmission phase of a transmission cycle, a packet in bit-serial optical form arrives at the tunable receiver 26 from the star coupler 21 (see FIG. 1) via the fiber 27. The packet is converted from bit-serial optical form to bit-serial electronic form using the optical-to-electronic converter 144. The packet is converted from serial to parallel form using serial-to-parallel converter 145 and is buffered in the buffer 146. To transmit the packet out of the output port 14, the packet is read out of the buffer 146 in parallel electronic form and converted to bit-serial form by the parallel-to-serial converter 147. The output of the parallel-to-serial converter 148 is used to modulate the laser transmitter 148, thereby reconverting the packet to optical form for transmission via the outgoing fiber trunk 18.

Note that the output port 18 is configured for use in the switch 10 of FIG. 1. In the switch 10 of FIG. 1 the token is passed sequentially from one output port 14 to the next. In the switch 10' of FIG. 2, all the output ports 14 receive the token in parallel via the lines 39 and only one of the output ports (e.g. 14-1 of FIG. 2) transmits the token back to the token generator.

The tunable receivers 26 of the input ports 14 may be implemented in a number of ways. For example, the tunable receiver 26 may include a plurality of fixed wavelength receivers corresponding to the wavelengths $\lambda_i \ldots \lambda_N$ emitted by transmitters 22-1 ... 22-N of the input ports 12-1 ... 12-N and a switching mechanism for activating a selected one of the receivers.

Alternatively, the tunable receiver may be formed using a fast tunable filter (see, e.g., H. Kawaguchi, K, Magari, K. Oe, Y. Noguchi, Y. Nakano, and G. Motosugi, "Optical Frequency- Selective Amplification in a Distributed Feedback Type Semi- conductor Laser Amplifier," Appl. Phys. Lett., 50:66–67, 1987; M.P. Vecchi, H. Kobrinski, E. L. Goldstein, and R.M. Bulley, "Wavelength Selection With Nanosecond Switching Times Using Distributed-Feedback Optical Amplifiers," in 14th European Conf. on Optical Commun., pages 247–250, Brighton, England, September 1988; M. Nishio, T. Numai, S. Suzuki, M. Fujiwara, M. Itoh, and S. Murata, "Eight Channel Wavelength Division Switching Experiment Using Wide Tuning Range DFB LD Filters," in Proc. of the 14th European Conf. on Comm., pages PDP 49–52, Brighton, England, September 1988; T. Numai, S. Murata, and I Mito, "Tunable Wavelength Filters Using $\lambda/4$-Shifted Waveguide Resonators," Appl. Phys. Lett., 53:83,1988), acousto-optic tunable filters, electron-optic tunable filters (see, e.g. Heismann, L.L. Buhl, and R.C. Alferness, "Electro-optically Tunable Narrow-band Ti:LiNbO$_3$ Wavelength Filter," Elec. Lett., 23:573, 1987; W. Warzansky, F. Heismann, and R.C. Alferness, "Polarization Independent Electro-optically Tunable Narrow-band Wavelength Filter," Appl. Phys. Lett., 53:13, 1988) or coherent heterodyne tunable filters (see, e.g., H.M. Foisel, "Ten-Channel Coherent HDTV Distribution System," in 13th European Conf. on Optical Commun., page 287, Helsinki, Finland, 1987; M. Fujiwara, N. Shimosaka, M. Nishio, S. Suzuki, S. Yamazaki, S. Muratza, and K. Kaede, "A Coherent Photonic Wavelength Division Switching System For Broadband Networks," in Proc. of the 14th European Conf. on Comm., pages 139–141, Brighton, England, September 1988; S. Yamazaki, M. Shibutani, N. Shimosaka, S. Murata, and M. Shikada, "Tunable Optical Heterodyne Receiver For Coherent FDM Broadcasting Systems," in Proc. of the 14th European Conf. on Commn., pages 86–90, Brighton, England, September 1988).

E. Packet Prioritization

Figure 10:
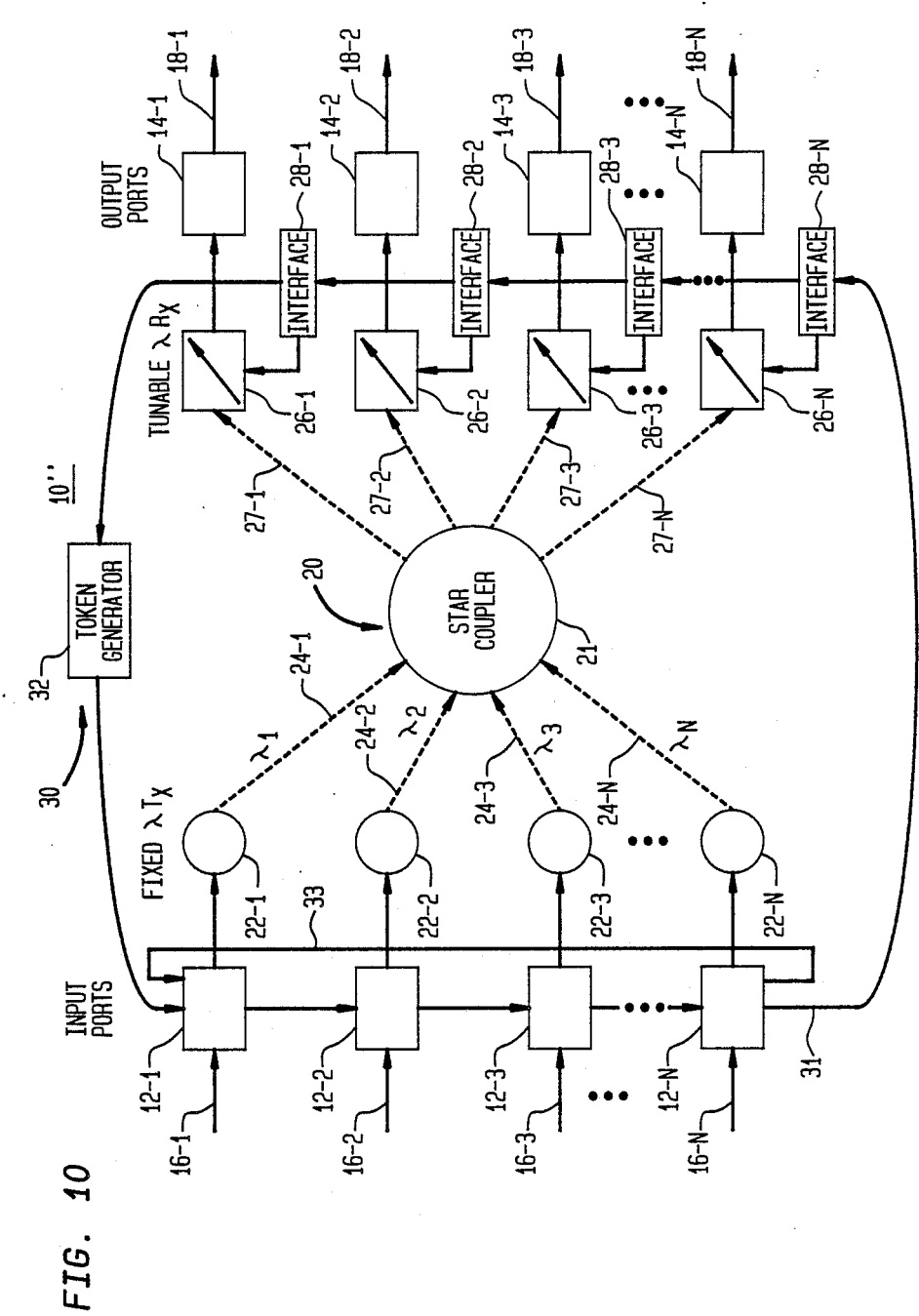
FIG. 10 illustrates a modification of the switch of FIG. 1 to account for packet prioritization.

A modification of the packet switch 10 of FIG. 1 to include packet prioritization is illustrated in FIG. 10. The packet switch 10" of FIG. 10 is identical to the packet switch 10 of FIG. 1 with the exception that the control network 30 includes the additional rack 33. The track 31 is referred to herein as a major track because it connects all the input ports and all the output ports. The track 33 is referred to herein as a minor track because it connects only the first and last input ports 12-1 and 12-N.

Assume that there are k priority classes as specified in the Priority Bits Field of the packet headers (see FIG. 3). Then the write phase of each transmission cycle will be divided into k sub-phases. This is accomplished through use of the minor track 33. In particular, the minor track 33 is used to recirculate the token k times during the write phase of each transmission cycle, so that a token passes each input port, starting with input port 12-1 and ending with input port 12-N, k times during each write phase. During the $j^{th}$ subphase only input ports with packets of priority class j can write into the token. Only after the $k^{th}$ subphase does the token pass along the track 31 to the output ports where the read phase of a transmission cycle takes place.

The above-described priority mechanism desirably serves not only to delineate priority classes, but also to provide fairness for random access packets and the guarantee of a reservation for circuit emulation packets. If a packet is denied access to its desired output port, it is delayed until the next transmission cycle. Assuming that the token generator always starts the tokens at the first input port (i.e. input port 12-1), then the input ports electrically closest to the token generator have an unfair advantage over those further from it. To compensate for this disadvantage, each time a packet loses contention, its priority is incremented by one class to offer the packet a better chance to win on the next cycle. Other fairness mechanisms are also possible. For example, in particular embodiments of the invention, the token generator may start the tokens at randomly selected input ports.

Packets with a guaranteed reservation are preferably assigned the highest priority. This priority class should not be attainable by "promotion" from lower priority classes through the fairness mechanism to try to make sure that packets with guaranteed reservations are transmitted in the very next transmission cycle.

With the above-described packet prioritization scheme, the inventive optical switch can simultaneously support packet switching and circuit emulation. The inventive switch can handle time multiplexed variable bit rate random access packets and reserved access packets within a single framework.

An example of the write phase of a transmission cycle for a packet switch with eight input ports, eight output ports, two priority classes and call splitting is shown in FIG. 11. FIG. 11 shows the full header for the packets present at the input ports including the source Address Field (SA), the Destination Bit Map Field $d_1 \ldots d_8$, and the Priority Bits Field, $P_2 P_1$. In this case there are two priority classes with $P_1 = 1$ indicating high priority and $P_2 + 1$ indicating low priority. FIG. 8 also shows the token including the Output Availability Field, $a_1 \ldots a_8$, and the Source Address Field, $A_8 \ldots A_1$, where the subfields $A_j$ are written with the addresses of particular input ports in the manner described above.

Since there are two priority classes in the example of FIG. 11, the write phase is divided in two subphases which are designated subphase #1 and subphase #2. As shown in FIG. 11, during subphase #1, the input ports having packets with priority $P_1 = 1$ write into the token to reserve particular output ports. During subphase #2 the input ports having packets with priority $P_2 = 1$ write into the token to reserve particular output ports.

Note that in the subphase #1 the token is written into by packets at the input ports 2,3,4, and 8 which have priority $P_1=1$. Note that all of these input ports including the input ports 3 and 4 which have multicast packets are able to reserve the desired output ports.

In the subphase #2, the input port with SA=1 is subject to call splitting. The packet at the input port with SA=1 is a low priority $P_2=1$, multicast packet which desires to transmit to output ports 3 and 7. Since output port 7 was previously reserved during subphase #1 by input port 4, call splitting is utilized and the input port 1 reserves only output port 3 in subphase #2. Similarly, the low priority multicast packet at input port 5 is only able to reserve one of its two desired output ports, and the unicast packet at input SA=6 is unable to reserve its desired output port in subphase #2. Note that the input port with SA=7 is idle. Packets that are not transmitted to all the desired output ports in the transmission cycle of FIG. 6 are buffered at the input ports for transmission in a subsequent transmission cycle.

F. Multiple Track Switch

Figure 12:
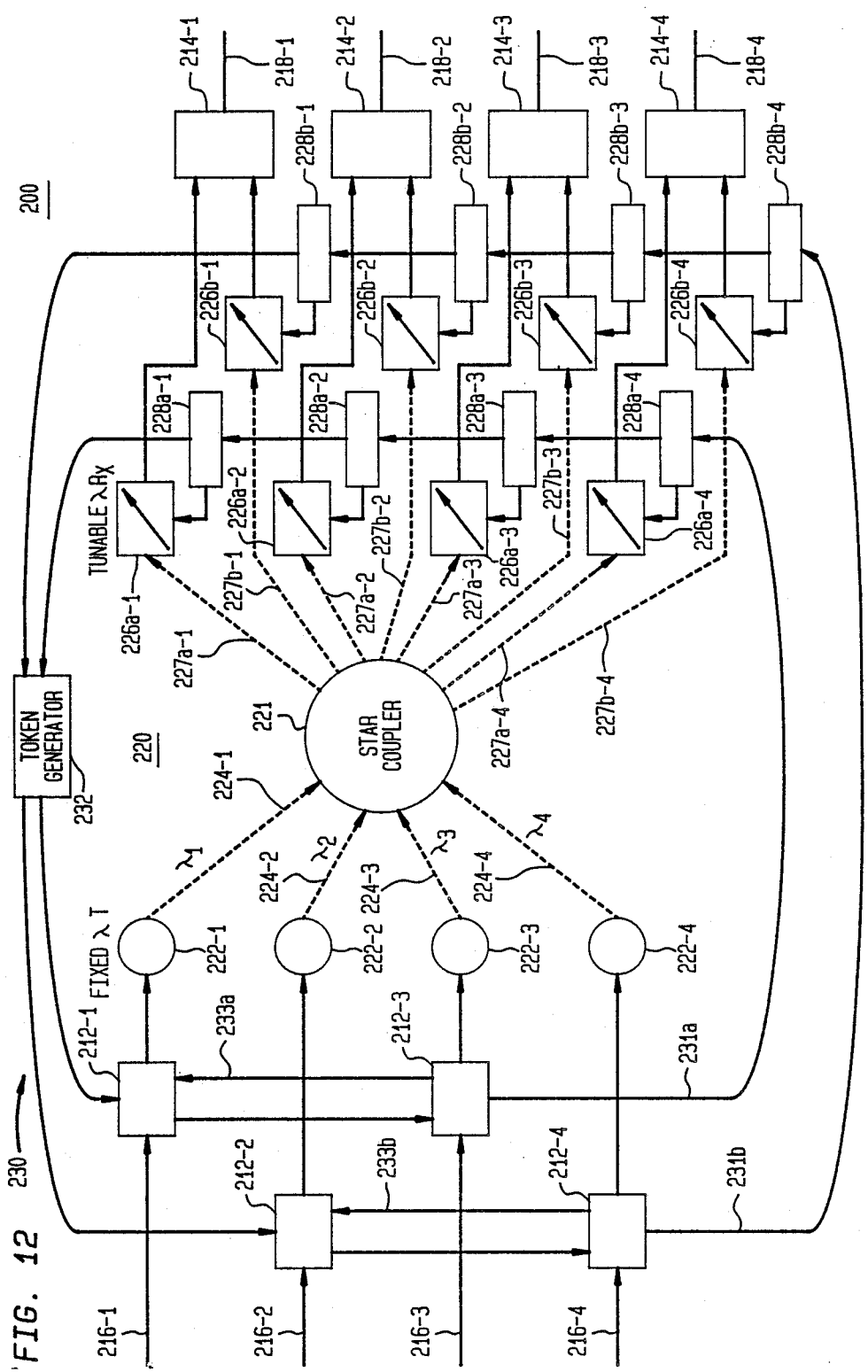
FIG. 12 illustrates an optical switch with multicast capability, which switch utilizes multiple control tracks in accordance with an alternative illustrative embodiment of the invention.

FIG. 12 schematically illustrates an optical switch 200 in accordance with an alternative embodiment of the present invention. The switch 200 of FIG. 12 comprises four input ports 212-1, 212-2, 212-3, 212-4 and four output ports 214-1, 214-2, 214-3, 214-4. Packets arrive at the input ports 212-1, 212-2, 212-3, 212-4 via the incoming optical fiber trunks 216-1, 216-2, 216-3, 216-4. These packets are routed to particular output ports by the switch 200 in accordance with addresses contained in the packet headers. The packets leave the output ports 214-1, 214-2, 214-3, 214-4 via the outgoing optical fiber trunks 218-1, 218-2, 218-3, 218-4.

Like the switch 10 of FIG. 1, the switch 200 comprises two internal networks. The optical star network 220 serves to transmit the packets from the input ports to the output ports. The electronic network 230 is a control network used to resolve packet contention.

Each of the input ports 212-1, 21-2, 212-3, 212-4 comprises a fixed wavelength transmitter 222-1, 222-2, 222-3, 222-4 which transmits at the wavelengths $\lambda_1,\lambda_2,\lambda_3,\lambda_4$. The optical transport network 220 also includes a 4x8 star coupler 221. The fixed wavelength transmitters 222-1, 222-2, 222-3, 222-4 are connected to the star coupler 221 via the optical fibers 224-1, 224-2, 224-3, 222-4. Each output port 214-1, 214-2, 214-3, 214-4 has two receivers 226a-1, 226b-1, 226a-2, 226b-2, 226a-3, 226b-3, 226a-4, 226b-4 associated therewith, respectively. The receivers 226a, 226b are wavelength tunable. The receivers 226a-1, 226a-2, 226a-3, 226a-4 are connected to the star coupler via the optical fibers 227a-1, 227a-2, 227a-3, 227a-4. Similarly, the receivers 226b-1, 226b-2, 226b-3, 226b-4 are connected to the star coupler 221 via the fibers 227b-1, 227b-2, 227b-3, 227b-4.

The star coupler 221 serves to transmit a fraction of the power produced at each of the input ports 212 to all of the receivers 226. The receivers are tuned under the control of the electronic control network 230 to pick out and detect a particular wavelength out of all of the wavelengths received.

Unlike the control network 30 of the switch 10 of FIG. 1, the control network 230 of the switch 200 of FIG. 12, comprises a plurality of major tracks 231a, 231b. The tracks 231a, 231b are connected to the token generator 32. The major track 231a sequentially connects the odd numbered input ports, i.e., the input ports 212-1, 212-3. The major track 231b sequentially connects the even numbered input ports, i.e., the input ports 212-4, 212-4.

As in the case of the switch 10 of FIG. 1, a transmission cycle of the switch 200 of FIG. 12 comprises two control phases and a transmission phase In the control phases, tokens emitted by the token generator 232 are utilized. During the first control phase, the odd numbered input ports reserve output ports by writing into a first token which propagates sequentially from input port to input port along the track 231a. Similarly, the even numbered input ports reserve output ports by writing into a second token propagating sequentially from input port to input port along track 231b.

In order to take proper account of packet priority classes, the first control phase may be divided into a plurality of subphases. During the $j^{the}$ subphase only input ports having packets of priority class j can write into the tokens. To recirculate the tokens after each subphase, the minor tracks 233a, 233b are provided.

During the second control phase, the token circulating on the track 231a is read by the interface units 228a-4, 228a-3, 228a-2, 228a-1, which interfaces control the tuning of the receivers 226a-4, 226a-3, 226a-2-226a-1. Similarly, the token circulating on the track 231b is red by the interfaces 228b-4, 228b-3, 228b-2, 228b-1, which interfaces control the tuning of the receivers 226b-4, 226b-3, 226b-2, 226b-1.

During the transmission phase of the transmission cycle, packets are transmitted from the input ports to the output ports using the optical star tranmission network 220.

The use of multiple major tracks in the inventive optical switch alleviates delays resulting from packet contention.

CONCLUSION

An optical packet switch with multicast capability has been disclosed. The switch comprises an optical transmission network illustratively in the form of a star for transmitting packets from a plurality of input ports to a plurality of output ports. The switch also comprises an electronic control network, illustratively, in the form of a track or ring, for resolving packet contention.

Finally, the above-described embodiments of the invention are intended to be illustrative only. Numerous alternative embodiments may be devised by those skilled in the art without departing from the spirit and scope of the present invention.

What is claimed is:

1. An optical switch with multicasting capability comprising
    a plurality of input ports for receiving packets via incoming fiber optic trunks,
    a plurality of output ports for transmitting packets via outgoing fiber optic trunks,
    an optical transmission network for optically transmitting said packets from said input ports to desired ones of said output ports, and
    an electronic control network in the form of at least one major track for passing a control token to said input ports and said output ports so as to resolve contention between packets arriving at said input ports.

2. The switch of claim 1 wherein
    each of said input ports includes a fixed wavelength transmitter, and each of said output ports includes a tunable receiver and means for reading said control token and for tuning said receiver in response thereto.

3. The switch of claim 2 wherein said optical transmission network has a star configuration.

4. The switch of claim 1 wherein said at least one track passes said token sequentially to said input ports and then sequentially to said output ports.

5. The switch of claim 1 wherein said at lest one track passes said token sequentially to said input ports and then in parallel to said output ports.

6. The switch of claim 1 wherein said packets have priority classes and said control network includes a minor track for enabling said token to be passed to each of said input ports once for each of said priority classes.

7. The switch of claim 1 wherein said control network includes a plurality of major tracks, each of said major tracks passing a control token to a subset of said input ports and to said output ports.

8. The switch of claim 7 wherein each of said major tracks has a minor track associated therewith so that said input ports can reserve output ports in accordance with packet priority classes.

9. An optical switch with multicasting capability comprising
   a control network including means for generating control tokens,
   a plurality of input ports and a plurality of output ports, said input ports receiving packets via a plurality of incoming optical fiber trunks and including means for reserving one or more output ports for each of said packets by writing appropriate information into said control tokens, said output ports including means for reading said control tokens so that packets can be received from particular input ports for further transmission via outgoing optical fiber trunks, and
   an optical transmission network for transmitting said packets from said input ports to said output ports.

10. The switch of claim 9 wherein said control network includes a track for passing said token sequentially to said input ports and then to said output ports.

11. The switch of claim 9 wherein said packets include priority classes and said control network includes means for recirculating said tokens so that said tokens are passed to said input ports once for each of said priority classes.

12. The switch of claim 9 wherein each of said input ports includes a fixed wavelength transmitter, each of said output ports includes a tunable receiver, and wherein each of said output ports includes means responsive to said reading means for tuning its receiver to the wavelength of a particular one of said transmitters.

13. The switch of claim 12 wherein said optical transmission network comprises
   a star coupler,
   a first set of optical fibers for connecting said fixed wavelength transmitters to said star coupler, and
   a second set of optical fibers for connecting said star coupler to said tunable receivers.

14. The switch of claim 9 wherein said token generating means generates a plurality of tokens simultaneously, and wherein said control network includes a plurality of major tracks for transmitting each of said plurality of tokens to a subset of said input ports and then to said output ports.

15. The switch of claim 14 wherein each of said major tracks has a minor track associated therewith to enable input ports to reserve output ports in accordance with packet priority classes.

16. An optical switch with multicasting capability comprising
   a plurality of input ports and a plurality of output ports,
   each of said input ports including means for reserving one or more particular output ports for a packet by writing information into a control token during a first control phase of a packet transmission cycle,
   each of said output ports including means for reading a control token during a second control phase of a packet transmission cycle so that said particular output ports are able to receive packets from particular input ports, and
   an optical transmission network for routing said packets from said particular input ports to said particular output ports during a transmission phase of a packet transmission cycle.

* * * * *

UNITED STATES PATENT AND TRADEMARK OFFICE
CERTIFICATE OF CORRECTION

PATENT NO. : 4,896,934

DATED : January 30, 1990

INVENTOR(S) : Edward Arthurs, Matthew S. Goodman, Chaong K. Kim, Tony T. Lee

It is certified that error appears in the above-indentified patent and that said Letters Patent is hereby corrected as shown below:

Column 3, line 52, "algorithm with call splitting for use" should read -- algorithm used in connection --.

line 52, after "algorithm", delete "with call splitting "for use".

Column 4, line 43, "$\lambda_1 \ldots \lambda_1$" should read -- $\lambda_1 \ldots \lambda_N$ --;

line 50, "$\lambda_1 \lambda_1$" should read -- $\lambda_1 \lambda_N$ --;

line 52, "$\lambda_1 \ldots \lambda_1$" should read -- $\lambda_1 \lambda_N$ --.

Column 5, line 56, "$P_j+1$" should read -- $P_j=1$ --.

Column 6, line 2, "$a_a$" should read -- $a_i$ --;

line 10, "$e_i+$" should read -- $e_i=$ --;

line 14, "$e_i+1$" should read -- $e_i=1$ --; and

"$d_i+1$" should read -- $d_i=1$ --.

line 17, "$d_i+1$" should read -- $d_i=1$ --;

line 18, "after $a_i$", add -- in the token Output Availability Field is logic "0" indicating that the output port corresponding to $d_i$ --;

line 19, "$a_i+1$" should read -- $a_i=1$ --.

UNITED STATES PATENT AND TRADEMARK OFFICE
CERTIFICATE OF CORRECTION

PATENT NO. : 4,896,934

DATED : January 30, 1990

INVENTOR(S) : Edward Arhurs, Matthew S. Goodman, Chong K, Kim, Tony T. Lee

It is certified that error appears in the above-indentified patent and that said Letters Patent is hereby corrected as shown below:

Column 7, line 42, "ot" should read --to--;
        line 66, "be" should read --by--.
Column 8, line 11, "in" should read --is--.
Column 9, line 67, "rack" should read --track--.
Column 10, line 56, "$P_2+1$" should read --$P_2=1$--.
Column 12, line 17, "j$^{the}$" should read --j$^{th}$--;
        line 25, "red" should read --read--;
        line 31, "tranmission" should read --transmission--.
Column 13, line 9, "lest" should read --least--.
Column 14, lines 7 and 8, "repsonsive" should read --responsive--.

Signed and Sealed this

Fourteenth Day of June, 1994

Attest:

BRUCE LEHMAN

*Attesting Officer*      *Commissioner of Patents and Trademarks*